United States Patent [19]
Schubert et al.

[11] Patent Number: 5,803,600
[45] Date of Patent: Sep. 8, 1998

[54] STATIC MICROMIXER WITH HEAT EXCHANGER

[75] Inventors: Klaus Schubert, Karlsruhe; Wilhelm Bier, Eggenstein-Leopoldshafen; Gerd Linder, Karlsruhe; Dieter Seidel, Eggenstein-Leopoldshafen, all of Germany

[73] Assignee: Forschungszentrum Karlsruhe GmbH, Karlsruhe, Germany

[21] Appl. No.: 728,344

[22] Filed: Oct. 9, 1996

[30] Foreign Application Priority Data

May 9, 1994 [DE] Germany .................. 44 16 343.6

[51] Int. Cl.⁶ .................. B01F 5/06; B01F 15/06
[52] U.S. Cl. .................. 366/144; 366/337; 366/340; 138/38; 165/109.1; 165/166
[58] Field of Search .................. 366/144, 147, 366/181.5, 336, 337, 340; 138/37, 38, 39, 42; 48/189.4; 165/109.1, 166

[56] References Cited

U.S. PATENT DOCUMENTS

| | | | |
|---|---|---|---|
| 4,112,520 | 9/1978 | Gilmore | 366/337 |
| 5,094,788 | 3/1992 | Schrenk et al. | 366/340 X |
| 5,137,369 | 8/1992 | Hodan | 366/340 |

FOREIGN PATENT DOCUMENTS

| | | |
|---|---|---|
| 0 260 736 | 3/1988 | European Pat. Off. . |
| 1 261 312 | 4/1961 | France . |
| 732 632 | 3/1943 | Germany . |
| 612 012 | 11/1948 | United Kingdom . |
| 2 073 604 | 10/1981 | United Kingdom . |
| WO 91/16970 | 11/1991 | WIPO . |

*Primary Examiner*—Charles E. Cooley
*Attorney, Agent, or Firm*—Klaus J. Bach

[57] ABSTRACT

In a static micromixer for mixing at least two fluids including a flow guide structure having a longitudinal axis extending in the general flow direction of the fluids through the guide structure, separate fluid admission areas disposed at the entrance end of the flow guide structure and a mixing chamber disposed at the exit end of the flow guide structure, the flow guide structure is formed by foils of a thickness of about 100 μm disposed on top of each other and having parallel grooves extending in one foil from one of the fluid admission areas at an angle with respect to the general fluid flow direction through the flow guide structure to the mixing chamber and in an adjacent foil from another of the fluid admission areas to the mixing chamber such that in the mixing chamber the fluid exits of different foils are disposed adjacent each other, the grooves having a width of less than 250 μm and being spaced from each other by less than 70 μm to provide for the fluid flow filaments entering the mixing chamber at different angles and closely adjacent each other.

3 Claims, 5 Drawing Sheets

STATIC MICROMIXER WITH HEAT EXCHANGER

This is a continuation-in-part application of international patent application PCT/EP95/00251 of 01/25/95, claiming priority of German patent application P 44 16 343.6 filed on May 9, 1994.

BACKGROUND OF THE INVENTION

The invention relates to a static micromixer having at least one mixing chamber and an upstream guide structure for admitting fluids to the mixing chamber to be mixed therein.

DE 31 14 195 discloses a mixing apparatus known as a channel mixer which comprises a number of oblong or square plate-like corrugated units which are welded, cemented or otherwise joined together to form a channel body. The desired shape of the channel body can be obtained also by special cutting of the various units. The corrugated units are composed of flat separating walls with grooved surface areas wherein the corrugations of adjacent units extend at an angle with respect to each other. In one embodiment, the arrangement is such that the channel body has parallel channels of equal length formed by single corrugation units such that the channels extend from the inlet side connected to two inlet channels to the outlet side connected to an outlet channel. Since the channel body consists of a number of corrugated units which are disposed on top of each other and of which every other one is alternately connected to the respective inlet channel from which a fluid consequently flows only into every second channel unit (in a vertical direction), the inlet to the intermediate units must be closed (see column 6, lines 10 to 34). Providing the required closures however, is quite expensive and no vacuum tightness or particular pressure resistance can be expected from such closures as they are generally required for chemical processing techniques since the corrugated passages are difficult to seal.

WO 91/16970 A1 (PCT/CH91/00109) discloses a mixer arrangement in a column with mixing- catalyzer- or channel elements which may be arranged in layers. Adjacent elements within a layer and subsequent elements of adjacent layers are arranged at an angle of inclination with respect to each other or, respectively, to the main flow direction. The elements may be plate-like and have parallel channels. In this way, the flow resistance is reduced and, in the transition areas of the channel elements to the column, space mixing is enhanced by turbulence resulting in good mixing of the partial streams. The mixing elements that is the channels thereof can be formed partially or fully as catalysts for improved catalytic reactions on the basis of the state of the art discussed above.

It is the object of the present invention to provide a static micromixer of this type which is easy to manufacture and which enhances mixing and reduces mixing times. If the fluids are to react chemically when being mixed total reaction should take place and it should be possible to remove or add reaction heat effectively and rapidly. Furthermore, the mixer should be of a vacuum tight and pressure resistant design.

SUMMARY OF THE INVENTION

In a static micromixer for mixing at least two fluids including a flow guide structure having a longitudinal axis extending in the general flow direction of the fluids through the guide structure, separate fluid admission areas disposed at the entrance end of the flow guide structure and a mixing chamber disposed at the exit end of the flow guide structure, the flow guide structure is formed by foils of a thickness of about 100 μm disposed on top of each other and having parallel grooves extending in one foil from one of the fluid admission area at an angle with respect to the general fluid flow direction through the flow guide structure to the mixing chamber and in an adjacent foil from another of the fluid admission areas to the mixing chamber such that in the mixing chamber the fluid exits of different foils are disposed adjacent each other, the grooves having a width of less than 250 μm and being spaced from each other by less than 70 μm to provide for the fluid flow filaments entering the mixing chamber at different angles and closely adjacent each other.

With the mixing arrangement according to the invention the fluids to be mixed are divided into extremely narrow spaced parallel flow filaments which, upon entering into the mixing chamber, are combined in a common closely limited space in which they mix rapidly and within a short flow distance. The density of the channel exits and consequently of the fluid flow filament at the entry into the mixing chamber is several thousand entry openings or fluid flow filament per $cm^2$.

The micromixer according to the invention facilitates providing a complete mixture of two or several fluids. If a micro heat exchanger is connected to the micromixer, also fluids which react chemically with each other can be mixed. The heat generated thereby (exothermal reaction) or the heat needed for the chemical reaction (endothermal reaction) is removed from, or supplied to, the fluid in the micro heat exchanger.

Preferred embodiments of the invention will be described on the basis of the accompanying drawings.

DESCRIPTION OF PREFERRED EMBODIMENTS

Figure 1A:
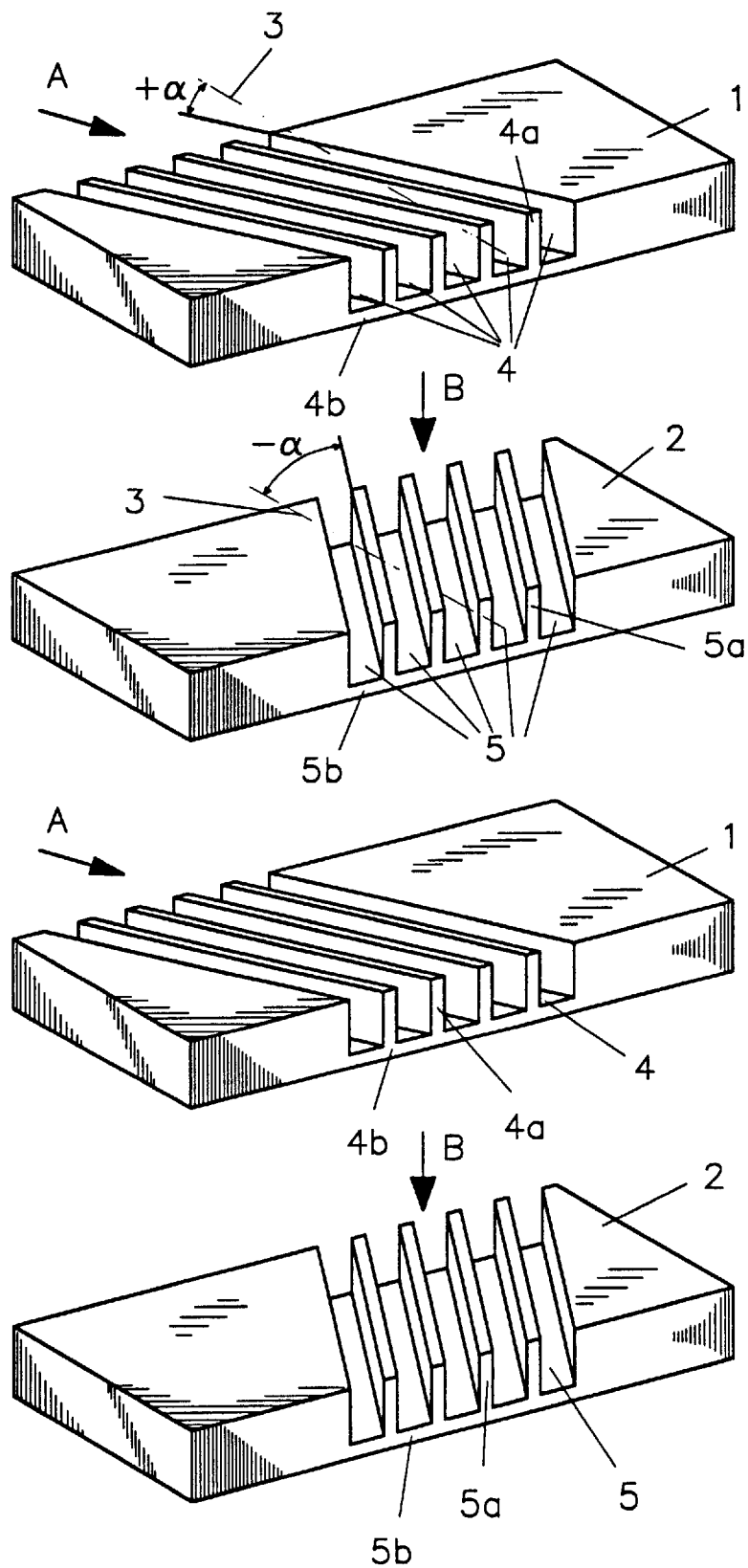
FIG. 1a is an exploded view of a mixer comprising several foils disposed on top of each other.

The foils 1 and 2 as shown in FIG. 1a have a thickness of about 100 μm and a length and width in the range of millimeters. The foils 1 includes a series of preferably parallel closely adjacent grooves 4 extending at an angle to the longitudinal mixer axis 3. The grooves 4 start at the left back (entrance end) and have an acute angle +α with respect to the axis 3. They end in the center area at the front (exit end) of the foil longitudinal side. The foils 2 are provided in the same manner with grooves 5 which are however arranged at an angle of −α with respect to the longitudinal axis of the mixer (in general flow direction) and which starts at the back right side (entrance end) and extend to the front center area (exit end) of the foils 2. The grooves 4 and 5 may be cut by shaped diamonds and have preferably a width of less than 100 μm a depth of 70 μm while the width of the intermediate webs 4a, 5a is 15 μm. The thickness of the groove bottoms 4b, 5b is 30 μm.

The tools and apparatus needed for the manufacture of microgrooves of various cross-sections are shown and described for example in DE 37 09 278 C2.

In FIG. 1a, the flow directions of the two fluids to be mixed are indicated by arrows A and B.

Figure 1B:
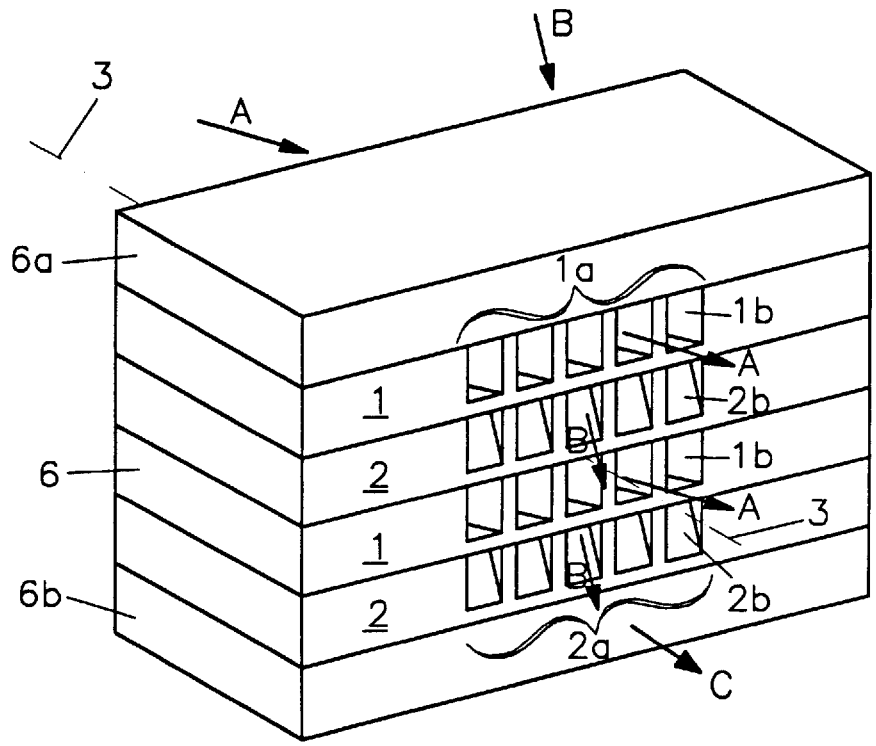
FIG. 1b and FIG. 1c show the micromixer from opposite sides.

For the manufacture of a flow guide structure 6, the type 1 and type 2 foils are alternately placed on top of one another and provided with an upper and a lower cover plate 6a, 6b, and are then joined, for example by diffusion welding, to form a sealed and pressure tight microstructure body. As apparent from FIG. 1b, the rows 1a, 2a of passages 1b and 2b have their exit openings to the mixing chamber 7 disposed adjacently on top of one another. (See also FIG. 1d).

Figure 1C:
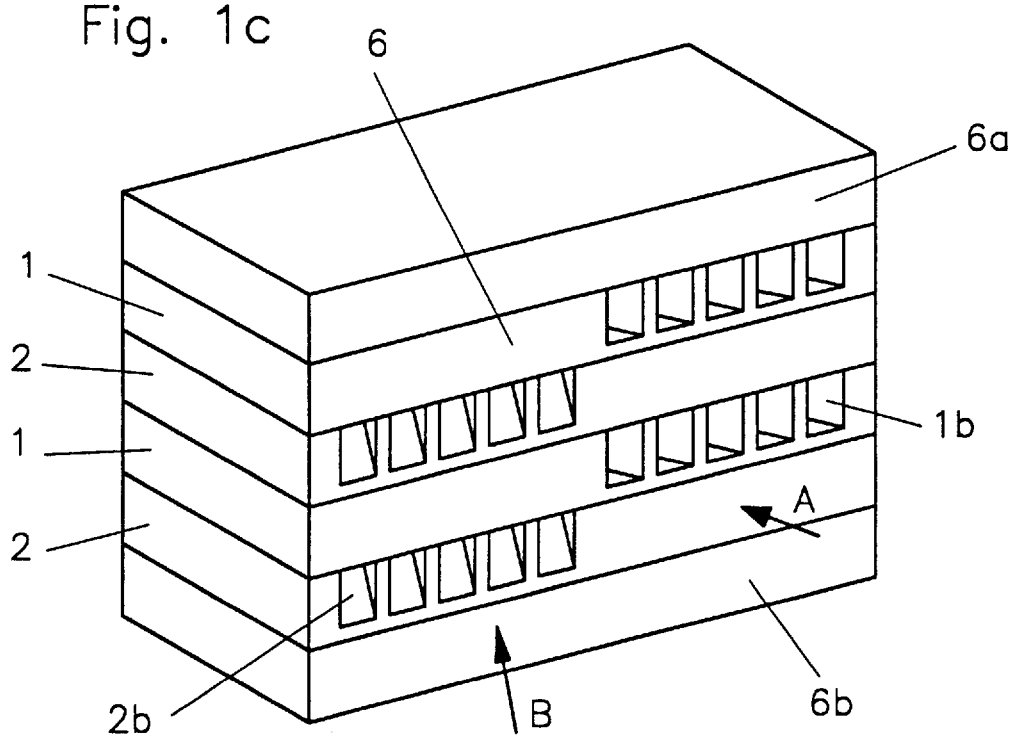

These rows 1a, 1b together define a square area with an opening density of about five thousand openings per cm² adjacent the mixing chamber 7. FIG. 1c shows the flow guide component 6 from the admission end of the fluids A and B. As can be seen herefrom and from the top view presented in FIG. 1d, the passages 1b, 2b which extend at an angle with respect to the longitudinal axis diverge from the mixing chamber 7 alternately in an opposite way toward the fluid entrance end in such a way that the fluids A and B can be supplied to the passages in the guide structure 6 separately by admission chambers 8 and 9. When exiting the guide structure 6 in the form of fine flow filaments the fluids A and B are intensely mixed with each other and form a common flow C.

Figure 2A:
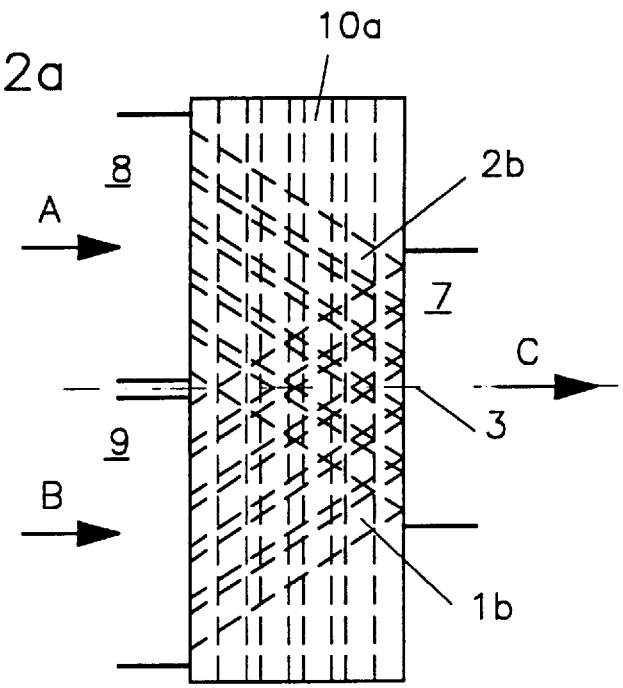
FIG. 2a and FIG. 2b show schematically a micromixer with a heat exchanger component wherein heat can be added to, or removed from, the fluid.
Figure 2B:
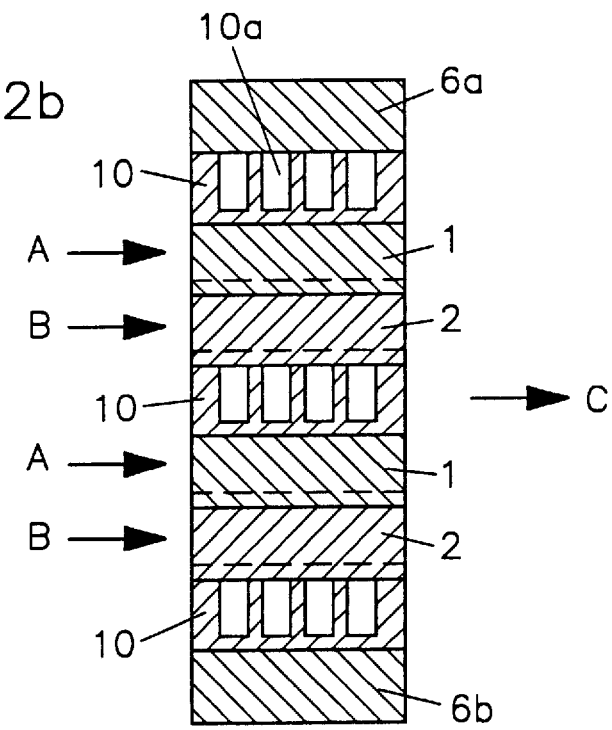

FIGS. 2a and 2b show an embodiment wherein intermediate foils 10 are disposed between the foil plates 1 and 2 and between the foil and cover plates 6a and 6b, intermediate foils 10 are disposed which have grooves 10a extending normal to the longitudinal axis 3 for conducting a cooling or heating medium therethrough. In this way the mixing time and also the reaction velocity of the fluids A and B can be influenced.

Figure 1D:
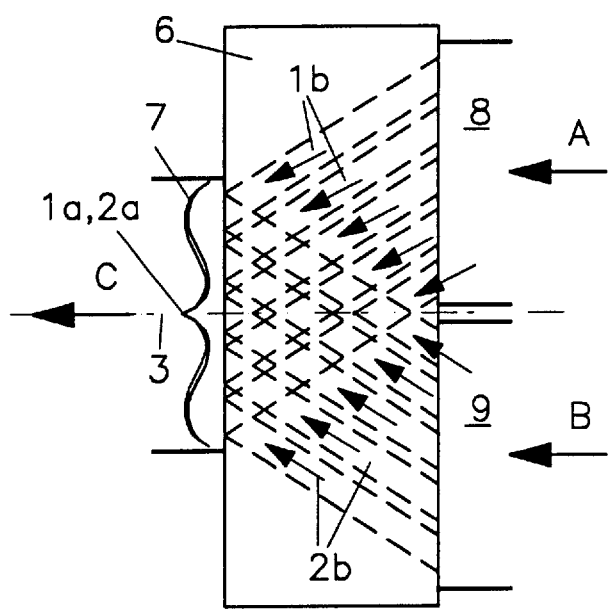
FIG. 1d shows schematically the flow scheme for a micromixer.
Figure 3A:
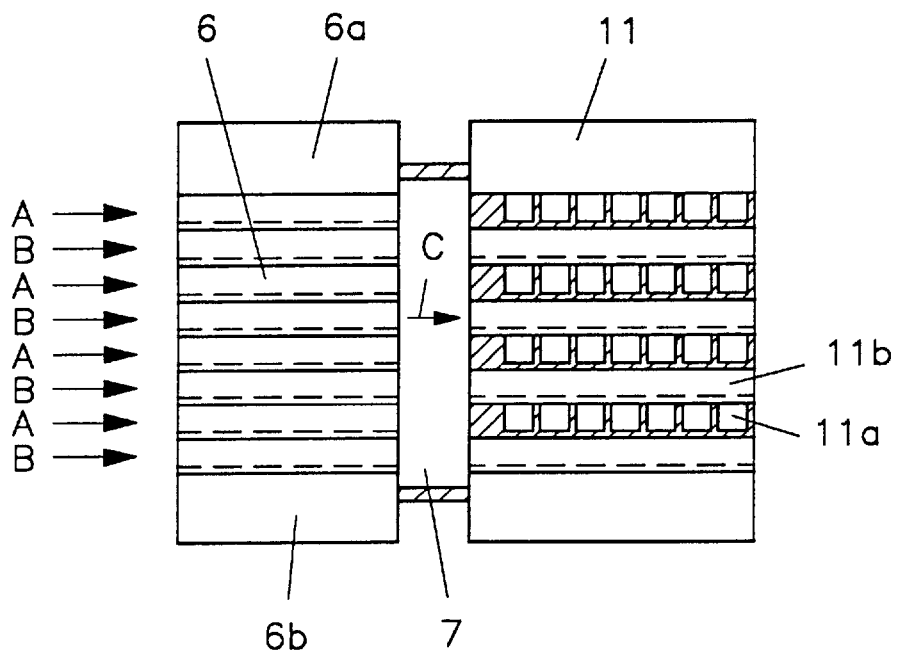
FIG. 3a is a cross-sectional view of a micromixer with an attached heat exchanger.

FIG. 3a is a cross-sectional view of a guide component 6 as shown in FIGS. 1a and 1d including an adjacent mixing chamber 7. Connected to the mixing chamber 7 is a heat exchanger 11 which, similar to the arrangement of FIGS. 2a and 2b, includes heat exchange channels 11a which extend transverse to the flow direction C of the fluids being mixed and by which reaction heat can be removed or supplied to the channels 11b.

Figure 3B:
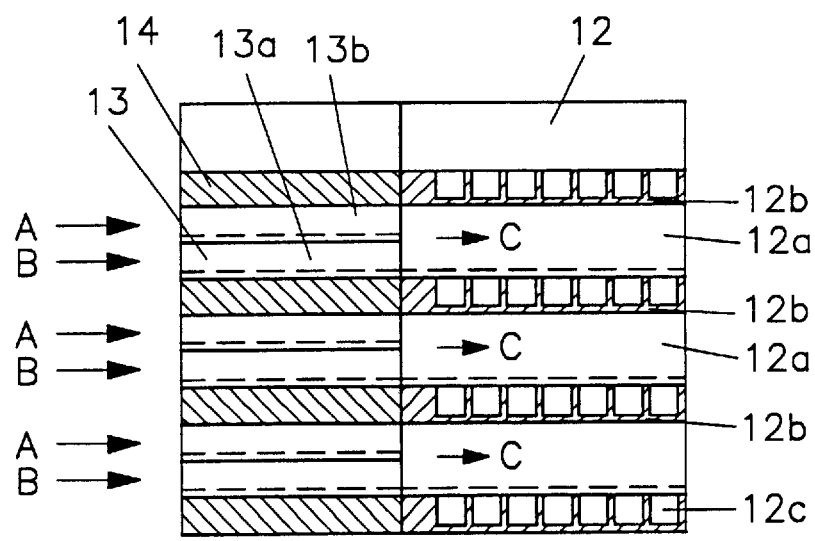
FIG. 3b shows a micromixer with a mixing chamber forming also a heat exchanger.

FIG. 3b shows a heat exchanger 12 being directly connected to the flow guide structure 13. In this embodiment every set of channels 13a, 13b for fluids A, B, disposed on top of one another is separated from an adjacent set by distance foils 14 and the channels 13a, 13b lead to a partial mixing chamber 12a of the heat exchanger. The partial mixing chambers 12a are delineated by a foil 12b which includes channels 12c extending transverse to the general fluid flow direction C.

The channels 12c receive a cooling or heating medium by which heat can be supplied to the mixing and reaction zones 12a or removed therefrom.

What is claimed is:

1. A static micromixer for mixing at least two fluids including: a flow guide structure having a longitudinal axis extending in the general flow direction of said fluids through said flow guide structure, said flow guide structure having a fluid entrance end with at least two separate entrance areas and a fluid exit end with a fluid mixing chamber and comprising flow guide elements disposed on top of one another and having flow channels with exit openings extending from said separate entrance areas at an angle with respect to said longitudinal axis such that the flow channels of adjacent elements cross each other without intersecting and extend to said mixing chamber where the channel exit openings of flow channels extending from said separate entrance areas are disposed, aligned in rows, on top of one another, said flow guide elements of said guide structure being guide foils having a thickness of 100 μm and a length and width in the millimeter range, and said flow channels being grooves having a width of less than 250 μm with a wall thickness between adjacent grooves and a groove depth of less than 70 μm so that the channel density at the fluid mixing chamber is several thousand per cm², an intermediate foil disposed between adjacent guide foils and including grooves extending normal to the longitudinal axis of the flow guide structure for conducting heating or cooling fluid therethrough, and at least an upper or lower cover plate disposed on said flow guide structure so as to form a vacuum and pressure tight arrangement.

2. A static micromixer for mixing at least two fluids including: a flow guide structure having a longitudinal axis extending in the general flow direction of said fluids through said flow guide structure, said flow guide structure having a fluid entrance end with at least two separate entrance areas and a fluid exit end with a fluid mixing chamber and comprising flow guide elements disposed on top of one another and having flow channels with exit openings extending from said separate entrance areas at an angle with respect to said longitudinal axis such that the flow channels of adjacent elements cross each other without intersecting and extend to said mixing chamber where the channel exit openings of flow channels extending from said separate entrance areas are disposed, aligned in rows, on top of one another, said flow guide elements of said guide structure being foils having a thickness of 100 μm and a length and width in the millimeter range, and said flow channels being grooves having a width of less than 250 μm with a wall thickness between adjacent grooves and a groove depth of less than 70 μm so that the channel density at the fluid mixing chamber is several thousand per cm², a micro heat exchanger connected to said mixing chamber such that the fluids exit said mixing chamber through said micro heat exchanger, said micro heat exchanger having heating or cooling channels extending therethrough in a direction transverse to the general flow direction of said fluids through said fluid guide structure, and at least an upper or lower cover plate disposed on said flow guide structure so as to form a vacuum and pressure tight arrangement.

3. A static micromixer for mixing at least two fluids including: a flow guide structure having a longitudinal axis extending in the general flow direction of said fluids through said flow guide structure, said flow guide structure having a fluid entrance end with at least two separate entrance areas and a fluid exit end with a fluid mixing chamber formed by a micro heat exchanger which is disposed immediately adjacent said guide structure and which includes partial mixing chambers formed by foil walls extending transverse to the flow direction of said fluids, said foil walls including passages for carrying a cooling or heating fluid, said flow guide structure comprising flow guide elements disposed on top of one another and having flow channels with exit openings extending from said separate entrance areas at an angle with respect to said longitudinal axis such that the flow channels of adjacent elements cross each other without intersecting and extend to said mixing chamber where the channel exit openings of flow channels extending from said separate entrance areas are disposed, aligned in rows, on top of one another, said flow guide elements of said guide structure being foils having a thickness of 100 μm and a length and width in the millimeter range, and said flow channels being grooves having a width of less than 250 μm with a wall thickness between adjacent grooves and a groove depth of less than 70 μm so that the channel density at the fluid mixing chamber is several thousand per $cm^2$, and at least an upper or lower cover plate disposed on said flow guide structure so as to form a vacuum and pressure tight arrangement.

* * * * *